United States Patent [19]

Neff

[11] 3,730,613

[45] May 1, 1973

[54] INFORMATION RECORDING AND REPLAY METHODS AND APPARATUS

[75] Inventor: Joseph J. Neff, Pasadena, Calif.

[73] Assignee: Bell & Howell Company, Chicago, Ill.

[22] Filed: Nov. 16, 1970

[21] Appl. No.: 89,995

[52] U.S. Cl. ...........352/72, 95/31 CA, 179/100.2 R, 226/113, 242/54.1, 242/71.1, 274/4 C, 274/11 F

[51] Int. Cl. ..........................B65h 17/00, G03b 1/18

[58] Field of Search...........................242/54.1, 71.1; 274/4 R, 4 C, 4 D, 11 R, 11 C, 11 E; 226/91, 113; 352/72, 78, 78 C; 95/31 CA; 179/100.2 R, 100.2 Z, 100.2 T

[56] References Cited

UNITED STATES PATENTS

| | | | |
|---|---|---|---|
| 2,513,423 | 7/1950 | Owens | 242/54.1 X |
| 3,157,882 | 11/1964 | Barnett | 352/72 |
| 2,554,354 | 5/1951 | Williams et al. | 242/54.1 X |
| 3,460,782 | 8/1969 | Findeisen | 274/4 C X |
| 3,612,539 | 10/1971 | Bragas | 179/100.2 Z X |
| 3,375,054 | 3/1968 | Hughes | 352/72 |
| 3,514,194 | 5/1970 | Aviyasu et al. | 352/72 |
| 3,490,833 | 1/1970 | Gottschalk et al. | 352/72 |

FOREIGN PATENTS OR APPLICATIONS

| | | | |
|---|---|---|---|
| 4,427,868 | 11/1969 | Japan | 179/100.2 Z |
| 1,537,240 | 10/1969 | Germany | 179/100.2 T |
| 257,426 | 4/1949 | Switzerland | 274/11 C |

OTHER PUBLICATIONS

I.B.M. Technical Disclosure Bulletin, Vol. 9, No. 8, Jan. 1967, Automatic Tape Threading by Johnson et al.

*Primary Examiner*—Joseph F. Peters, Jr.
*Attorney*—Luc P. Benoit

[57] ABSTRACT

Methods and apparatus for performing a function (such as recording or playback) relative to an elongate information carrier located in a casing include the provision of a capstan at a distance from the casing and an extraction of a length of the information carrier out of the casing in a direction away from the casing by finger means. A portion of the extracted information carrier is placed onto the capstan with the finger means and the capstan is employed to advance the information carrier. The desired function is then performed relative to the information carrier.

50 Claims, 9 Drawing Figures

INVENTOR.
JOSEPH J. NEFF
BY
ATTORNEY.

INVENTOR.
JOSEPH J. NEFF
BY
ATTORNEY.

INVENTOR.
JOSEPH J. NEFF
BY
[signature]
ATTORNEY.

INFORMATION RECORDING AND REPLAY METHODS AND APPARATUS

BACKGROUND OF THE INVENTION

1. Field of the Invention

The subject invention relates to methods and apparatus for handling and advancing elongate information carriers which are located in a casing. While not limited to any particular field, the invention relates particularly to the recording and playback of information from magnetic recording tapes located in tape cartridges or cassettes, and the photographing and display of pictorial information on photographic films located in film cartridges.

2. Description of the Prior Art

The use of magnetic tape cassettes has become widespread in recent years. In these cassettes, winding and unwinding of magnetic recording tape are performed simultaneously in the same casing. In this manner, extra equipment for winding advancing tape into a coil outside the casing is obviated, as is the need for rewinding the tape back into the casing preparatory to the removal of the tape cartridge from the tape recorder.

In many applications, these advantages are balanced or outweighed by serious drawbacks. In the most widespread type of tape cassette, these drawbacks include a limited accessibility to the recording tape which proceeds past apertures and windows in the casing. As a result, the diameter of the drive capstan that can be used in cassette recorders is very limited. Similarly, there are limitations as to the type and size of transducers and other devices that can be used on the tape in cassette recorders.

Moreover, rapid start-stop capabilities have so far been lacking in tape cassette equipment of practical design. This has barred typical cassette design from such fields as dictating equipment and digital or analog recording for instrumentation or data processing purposes.

In a similar vein, the provision of motion picture and other photographic film cartridges is becoming more and more widespread. In recent years, a type of film cartridge has been developed in which the film is advanced from a film supply region in a casing to a film takeup region in the same casing, by way of a window which is provided in a peripheral casing portion.

In similarity to the above mentioned recording tape cassette, the latter type of film cartridge has the advantage that the film need not be dynamically stored outside of the casing in a photographing or display operation, but is advanced directly into a takeup region in the same casing. This protects the film from outside influences and makes for a rapid and convenient exchange of film cartridges.

On the other hand, the limited access to the film provided by the casing window imposes limitations in terms of film advancing, film recording and film display equipment, and necessitates a removal of the entire film from the cartridge for processing purposes, including film development.

SUMMARY OF THE INVENTION

The subject invention avoids the above mentioned disadvantages and provides methods and apparatus which are of utility in the above mentioned tape cassette and film cartridge areas, as well as in other fields in which functions are to be performed relative to an elongate information carrier which is located in a casing.

From a first aspect thereof, the subject invention is concerned with a method of performing a function relative to an elongate information carrier located in a casing. According to the invention, this method is characterized by the improvement comprising in combination the steps of providing a capstan for driving said information carrier at a distance from said casing, providing finger means for extracting a length of said information carrier from said casing, inserting part of said finger means into said casing through said window and in between said information carrier portion and adjacent peripheral housing portion, moving said inserted finger means part behind said information carrier portion inside said casing, extracting with said finger means a length of said information carrier from said casing, placing with said finger means a portion of said extracted information carrier length onto said capstan, moving said finger means out of engagement with said information carrier advancing said information carrier with said capstan while said finger means are out of engagement with said information carrier, and performing said function relative to said information carrier while said finger means are out of engagement with said information carrier.

In accordance with a preferred embodiment of the invention, the method under consideration includes the further steps of advancing the information carrier out of the casing in a direction away from the casing and substantially simultaneously back into the casing by way of a function-performing station spaced from the outer periphery of the casing, and the steps of performing the function relative to the carrier at the latter station.

In accordance with a preferred embodiment of the invention, the finger means are moved during said extraction at an inclined angle as seen from said casing in the direction of said capstan so as to clear said capstan during movement of said finger means away from said casing, and said finger means are then moved laterally past said capstan so as to effect said placing of a portion of said extracted information carrier length onto said capstan.

By way of example, the above mentioned function may be a replay of information from the information carrier, and the information is then replayed from the information carrier at the mentioned station which is spaced from the outer periphery of the casing.

By way of further example, the information carrier may be a magnetic recording tape, and the named function may be a magnetic recording of information. Information is then magnetically recorded on the tape at the above mentioned spaced station.

Alternatively or additionally, the information carrier may be a magnetic recording tape having information recorded thereon, and the named function may be a playback of magnetically recorded information at the above mentioned station spaced from the outer periphery of the casing.

By way of further example, the information carrier may be a pictorial information carrier, such as a photographic film. The named function may then be a recording of pictorial information on the carrier at the above mentioned station. Alternatively or additionally, the information carrier may have pictorial information recorded thereon, and the named function may be a display of the pictorial information from the carrier.

Reverting to the above mentioned preferred embodiment of the method according to the subject invention, it will be noted that the information carrier is advanced in a direction away from the casing and substantially simultaneously back into the casing by way of a function-performing station spaced from the outer periphery of the casing. This, of course, places the function-performing station outside of the casing and yet places advancing carrier portions back into the casing substantially simultaneously with their removal from the casing. This return of advancing carrier portions to the casing is, of course, not exactly simultaneously with their removal from the casing, since the removed carrier portions travel away from the casing and through or past the function-performing station before returning back into the casing. This, of course, imposes a certain delay between the removal of an incremental carrier portion from the casing and the return of that particular carrier portion back into the casing. Typically, however, the function of removing portions of the information carrier from the casing and returning other portions of the information carrier into the casing are performed simultaneously, except for particular instances in which the loop of information carrier formed by the above mentioned method outside of the casing is to be expanded or diminished in size.

In accordance with a preferred embodiment of the subject invention, a window permitting access to the information carrier is defined by peripheral portions of the casing, and the information carrier is advanced out of the window at a first location and, by way of a function-performing station, back into the window at the second location spaced from the first location.

In accordance with a further preferred embodiment of the subject invention, the information carrier has a first end connected to first rotary means mounted in the casing, and a second end connected to second rotary means mounted in the casing. The information carrier is then selectively wound on, and unwound from, the first and second rotary means.

From another aspect thereof, the invention resides in a method of performing a function relative to an elongate information carrier located in a casing, and resides more specifically in the improvement comprising in combination the steps of providing a capstan for driving said information carrier at a distance from said casing, providing finger means for extracting a length of said information carrier from said casing, extracting with said finger means a length of said information carrier from said casing, moving said finger means during said extraction at an inclined angle as seen from said casing in the direction of said capstan so as to clear said capstan during movement of said finger means away from said casing, thereafter moving said finger means laterally past said capstan so as to place a portion of said length of extracted information carrier onto said capstan, advancing said information carrier with said capstan, and performing said function relative to said information carrier. In accordance with a preferred embodiment of the invention, said finger means are partially inserted into said casing in between said information carrier and an adjacent portion of said casing, said partially inserted finger means are moved behind said information carrier inside said casing, and said partially inserted finger means are then extracted for extracting a length of said information carrier from said casing. In accordance with a further preferred embodiment of the invention, said finger means are provided with two finger portions, said finger portions are placed into a first position for an insertion of said finger portions into said casing in between said information carrier and an adjacent portion of said casing, said inserted finger portions are moved from said first position to behind said information carrier inside said casing, said inserted finger portions are then extracted for extracting a length of said information carrier from said casing, said extracted finger portions are moved at said inclined angle so as to clear said capstan, and said extracted finger portions are thereafter moved laterally past said capstan, with one finger portion being moved past said capstan to one side thereof and the other finger portion being moved past said capstan to the other side thereof, so as to place a portion of said length of extracted information carrier onto said capstan.

From another aspect thereof, the subject invention resides in apparatus for performing a function relative to an elongate information carrier located in a casing and having a portion initially located inside a window defined by peripheral casing portions. According to the subject invention, these apparatus are characterized by the improvement comprising, in combination, a capstan for driving said information carrier at a distance from said casing, finger means for extracting a length of said information carrier from said casing, said finger means having a part adapted for insertion into said casing through said window in between said information carrier portion and adjacent peripheral housing portion, means connected to said finger means for inserting said finger means part into said casing through said window in between said information carrier portion and adjacent peripheral housing portion, means connected to said finger means for moving said inserted finger means part behind said information carrier portion inside said casing, means connected to said finger means for extracting with said finger means a length of said information carrier from said casing, means connected to said finger means for placing with said finger means a portion of said extracted information carrier length onto said capstan, means connected to said capstan for advancing said information carrier, means for performing said function relative to said information carrier, and means for maintaining said finger means out of engagement with said information carrier and with said capstan during said advance of said information carrier and performance of said function.

In accordance with a preferred embodiment of the invention, the latter advancing means include means operatively associated with the information carrier for advancing the information carrier out of the casing in a direction away from the casing and substantially simultaneously back into the casing by way of a location spaced from the outer periphery of the casing, and the latter means for performing said function include means operatively associated with the information carrier for performing the above mentioned function relative to the information carrier at the named location spaced from the outer periphery of the casing. This, of course, places the named location outside of the casing and in spaced relationship thereto.

From another aspect thereof, the subject invention resides in apparatus for performing a function relative to an elongate information carrier located in a casing, and resides more specifically in the improvement comprising in combination a capstan for driving said information carrier located at a distance from said casing, finger means for extracting a length of said information carrier from said casing, means connected to said finger means for moving said finger means during said extraction at an inclined angle as seen from said casing in the direction of said capstan so as to clear said capstan during movement of said finger means away from said casing and for thereafter moving said finger means laterally past said capstan so as to place a portion of said length of extracted information carrier onto said capstan, means connected to said capstan for advancing said information carrier with said capstan, and means for performing said function relative to said information carrier. According to a preferred embodiment of the subject invention, these apparatus are characterized by the improvement comprising, in combination, means operatively associated with the information carrier for advancing the information carrier out of the window at a first location to a second location spaced from the outer periphery of the casing and thence back into the window at a third location spaced from the first location, and means operatively associated with the information carrier for performing the function relative to the information carrier at the second location spaced from the outer periphery of the casing.

In accordance with a preferred embodiment of the subject invention, the casing has spaced first and second rotary means mounted therein. The elongate information carrier has a first end connected to the first rotary means and includes a first length wound on the first rotary means. The elongate information carrier further includes a second length extending from the wound first length across the window from one side to another side of this window and to the second rotary means, and a second end connected to the second rotary means. The carrier advancing means include means for pulling portions of the first carrier length out of the window, and means for subsequently winding the pulled-out portions of the first carrier length onto the second rotary means.

From yet another aspect thereof, the subject invention resides in apparatus for performing a function relative to an elongate information carrier located in a casing and having a portion initially located inside a window defined by peripheral casing portions. The invention according to the latter aspect resides, more specifically in the improvement comprising, in combination, a capstan for driving said information carrier located at a distance from said casing, finger means including a pair of finger portions for extracting a length of said information carrier from said casing, means coupled to the finger means for placing the finger portions into a first position for an insertion of the finger portions into the casing through the window and in between the information carrier and a peripheral casing portion, means coupled to the finger means for selectively placing the finger portions from said first position into a second position behind the information carrier in the casing means coupled to the finger means for extracting the finger portions with the length of said information carrier from the casing, means coupled to the finger means for placing a portion of said extracted length of information carrier onto said capstan at a distance from said casing, means connected to said capstan for advancing said information carrier, means for performing said function relative to said information carrier, and means for maintaining said finger means out of engagement with said information carrier and with said capstan during said advance of said information carrier and performance of said function.

BRIEF DESCRIPTION OF THE DRAWINGS

The subject invention will become more readily apparent from the following detailed description of preferred embodiments thereof, illustrated by way of example in the accompanying drawings, in which.

Like reference numerals in the drawings designate like parts. While this brief description of the drawings is styled above in terms of apparatus, it should be understood that FIGS. 1 through 9 illustrate also the methods according to the subject invention and preferred embodiments of these methods.

DESCRIPTION OF PREFERRED EMBODIMENTS

Figures 1, 3:
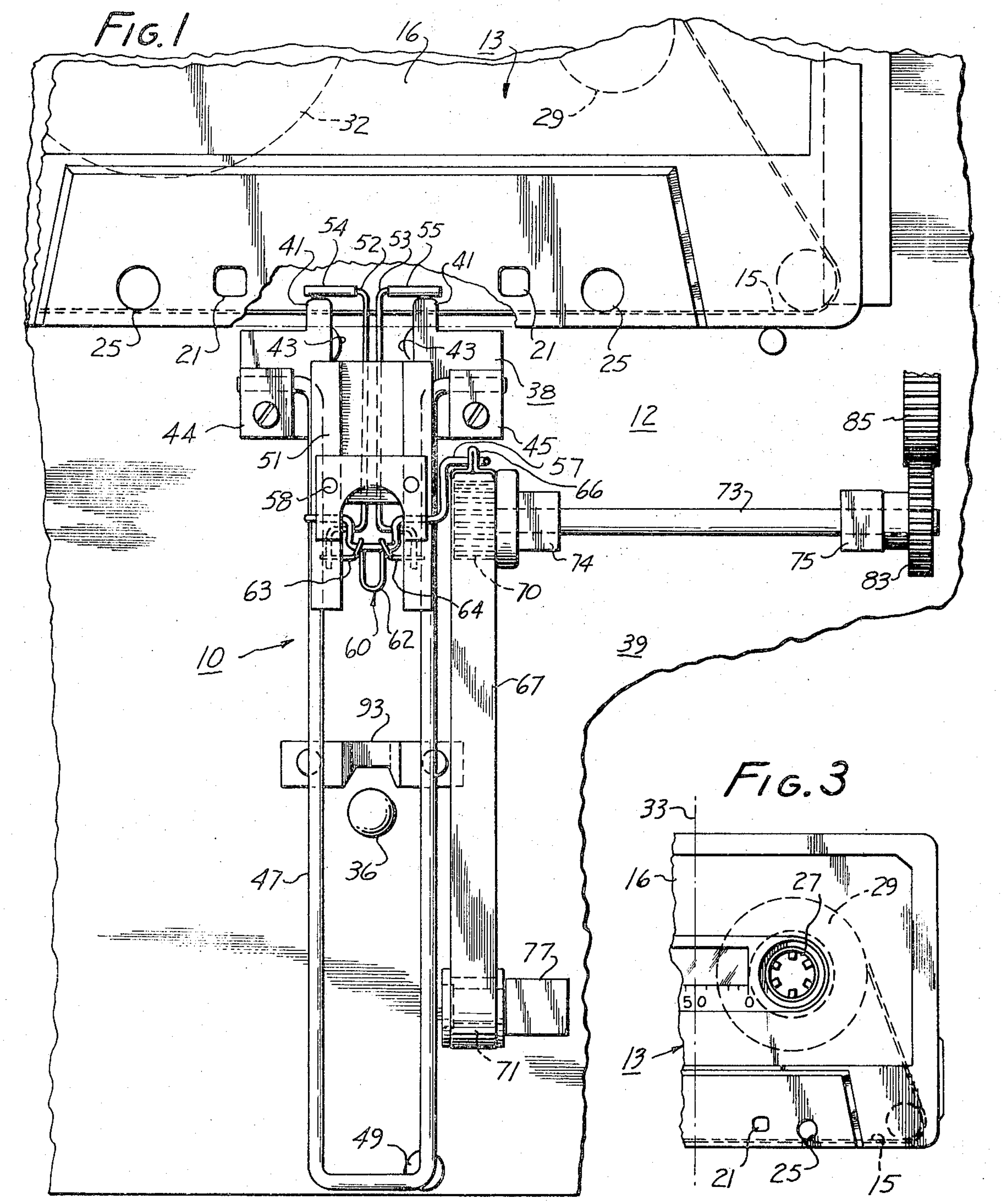
FIG. 1 is a top view of an apparatus in accordance with a preferred embodiment of the subject invention and of functionally related portions of a cassette tape recorder.
FIG. 3 is a fraction of a top view of the tape cassette shown in FIG. 2.

The illustrated tape handling and advancing apparatus 10 is in the drawings combined with a cassette-type magnetic tape recorder 12, only parts of which are shown for increased clarity. The recorder 12 typically operates with magnetic tape cassette 13 of standard design, as shown in FIGS. 1 to 3.

The tape cassette 13 has a magnetic recording tape 15 located in a casing 16. The tape 15 passes from side to side through a number of windows 17, 18 and 19 which are provided by peripheral portions of the casing 16. The window 18 is typically employed for the insertion of a recording and playback head into the cassette for contact with the tape. The window 15 or the window 19 is frequently used for the insertion of an erasing head into the cassette and into contact with the tape. These uses of the windows 15 to 19 are, of course, only illustrative of a variety of alternatives.

Figure 2:
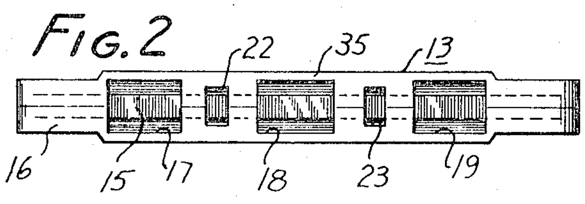
FIG. 2 is a front view on a reduced scale of a tape cassette used in the apparatus of FIG. 1.

The cassette 13 further has centering holes 21 as shown in FIGS. 1 and 3. These centering holes are located above and below the apertures 22 and 23 shown in FIG. 2, and in the instant case serve to locate the cassette 13 relative to the tape guiding and handling apparatus 10. The cassette 13 also has circular apertures 25, which extend through both top and bottom surfaces of the cassette as seen in FIGS. 1 and 3.

The apertures 25 are provided in the casing 16 during the manufacture of the cassette and permit the insertion of a tape drive capstan into the cassette and into engagement with the recording tape therein. While the standard apertures 25 are not used in apparatus according to the subject invention for capstan accommodating purposes, it is helpful to the understanding of the subject invention to consider their use in prior-art recorders.

Following this thought it will be recognized that serious limitations occurred in prior-art equipment due to the fact that the recording tape was housed in a cassette and was employed for recording and playback purposes while being so housed. In particular, this mode of operation required the insertion of a drive capstan into the cassette which, as mentioned above, took place through an aperture 25. This, of course, limited the permissible size of the capstan diameter, thereby restricting at least the attainable speed of the recording tape and raising the danger that the tape would become wrapped around the small-diameter capstan. In addition, this mode of operation required the presence of a pinch roller which had to be moved selectively into and out of the cassette 13 through one of the windows 15 and 19. This further reduced the attainable tape speed and called for an additional actuating mechanism and control for moving the pinch roller.

Moreover, prior-art insistence on performing recording, playback and other operations by equipment inserted into the cassette through windows of limited size necessarily imposed limitations on the use of tape cassettes and tape cassette recorders and playback machines.

As indicated above, similar limitations are encountered in connection with film cartridges in which photographic film is advanced from a film supply region to a film takeup region from side to side through a cartridge window. While the drawings and their description are styled in terms of magnetic tape recording, it should be understood that the principles of the subject invention and of preferred embodiments thereof may also be applied to such areas as film cameras, projectors, and processing equipment employing film cartridges. By way of example, a film cartridge on which the subject invention may be practised is shown in the following patent, which is herewith incorporated by reference herein: U.S. Pat. No. 3,208,686, by Evan A. Edwards et al., issued Sept. 28, 1965.

The illustrated preferred embodiments of the subject invention take advantage of the positive points of tape cassettes, which include the fact that both ends of the recording tape 15 are connected to rotary members inside the casing 16 and are selectively wound on, and unwound from, these rotary members. One of these rotary members is shown in FIG. 3 in the form of a hub 27 which is mounted in the casing 16 in accordance with standard practice. A spindle 28 engages the hub 27 for winding the recording tape 15 onto this hub in the form of a coil 29 when the cassette 13 has been located in the recorder 12 and the recorder drive has been energized. Suitable recorder drives are conventional and well-known, so that the drive has only been shown in block diagram at 30 in FIG. 9. Initially, a first length of the recording tape 15 is wound on a further hub member in the form of a coil 32. Appearance and mounting of that hub member are the same as those of the hub member 27, so that the hub member which supports the coil 32 has not been shown in the drawings. In this respect the cassette 13 may be considered symmetrical about the axis 33 shown in FIG. 3.

A second length of the recording tape 15 extends from the wound first length in the coil 32 across the window 18 from one side to another side of this window and thence to the hub member 27 or to the coil 29 on that hub member. The recording tape 15 has a retracted position in which a length of the tape is located inside of the window 18 within the peripheral casing portions 35 that define this window. Those familiar with the operation of cassette recorders will recall that prior-art recorders operate on the recording tape by a recording head or other devices while the tape is in its retracted position within the window 18.

According to one aspect of the subject invention, a length of the tape 15 is moved out of the casing 16 through the casing window 18 and is placed about part of the periphery of a capstan 36. This extraction of the tape 15 from the cassette 13 is effected by the above mentioned apparatus 10.

To this end the apparatus 10 includes a block 38 attached to a base plate 39 of the recorder.

As is best seen in FIGS. 1, 4, 5 and 9, the block 38 has projecting tape guide members 41. These members 41 project into the casing window 18 when the cassette is located in its place in the recorder and restrain the recording tape 15 against movements lateral to the direction of tape advance. The block 38 also mounts a pair of rotatable rollers 43 which serve to guide the recording tape 15 as it is being pulled out of the window 18, as well as after it has been so pulled out.

The block 38 also has a pair of pivots 44 and 45 for a substantially U-shaped track 47. A stop 49 may be provided on the base plate 39 as indicated in FIG. 1 to provide for a confinement of the downward movement of the free end of the track 47, so as to determine the level at which portions of the apparatus 10 will enter the cassette window 18.

A carriage 51 is mounted on the track 47 for sliding movement therealong. The carriage 51 carries a pair of fingers 52 and 53 which have finger portions 54 and 55. These finger portions are formed of end portions of the wires which provide the fingers 52 and 53 and of sleeves of a conventional wear-resistant flexible material.

A bent piece of wire forms a finger actuator 57 which is pivotally mounted on the carriage 51 with the aid of a metal plate 58. The finger actuator 57 is connected by a wire spring 60 to the fingers 52 and 53.

Figure 7:
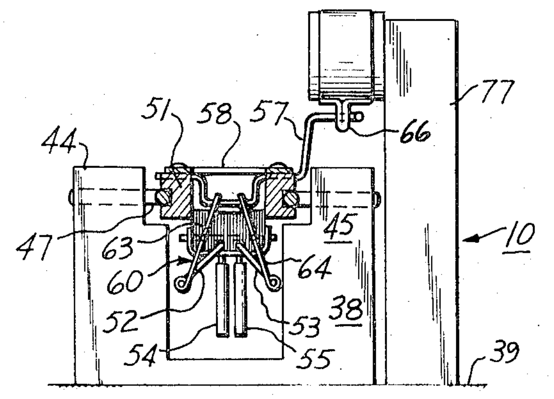
FIG. 7 is a rear view of part of the apparatus of FIG. 1, as positioned approximately in the manner shown in FIG. 6, with certain parts removed for a better view of the illustrated components.

The wire spring 60 has a bight portion 62 and a pair of legs 63 and 64. As best seen in FIG. 7, the leg 63 is connected to the finger 52, whilst the leg 64 is connected to the finger 53.

The illustrated wire spring 60 and arrangement of the fingers 52 and 53 and finger actuator 57 impart a bistable character to the actuation of the fingers 52 and 53. Accordingly, the finger portions 54 and 55 have a first position in which they extend substantially in parallel to an edge of the recording tape 15, as well as a second position in which they extend substantially at right angles to a recording tape edge. The spring wire legs 63 and 64 are designed for lateral flexing, and the spring wire bight portion 62 is designed for torsional loading thereby providing for the above mentioned bistable actuation of the fingers between their position shown in FIG. 1 and their position shown in FIGS. 4 to 8.

A bracket 66 connects the finger actuator to an endless flexible belt 67. The endless belt 67 has teeth 68 at the inside thereof (see FIG. 8). The teeth 68 mesh with a pair of gear pulleys 70 and 71.

The pulley 70 is mounted adjacent the block 38 and thus in the vicinity of the cassette window 18 by a shaft 73 which extends through a pair of bearing blocks 74 and 75. The pulley 71, on the other hand, is rotatably mounted on a block 77 at a location which is beyond the capstan 36 as seen from the cassette window 18. The block 77 is higher than the block 74 so that the endless belt 67 ascends at an inclined angle as seen from the cassette window 18. The angle of inclination is such that the finger portions 54 and 55 with the extracted length of recording tape will clear the capstan 36 as the carriage 51 moves along the tracks 47 in a direction away from the cassette window 18.

Figure 9:
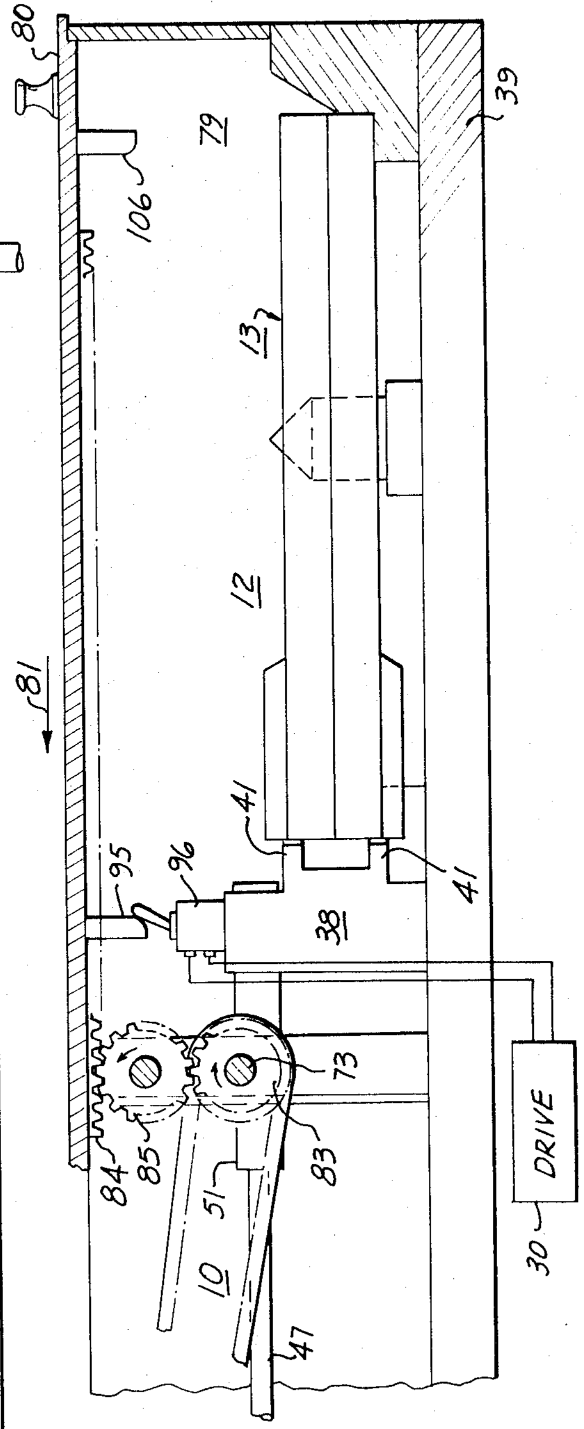
FIG. 9 is a side view of a modification of the apparatus of FIG. 1 in accordance with yet another preferred embodiment of the subject invention.

The operation of the tape advancing and extracting apparatus 10 will now be considered with the aid of FIG. 9. To this end it is assumed that the tape recorder 12 has a well 79 for receiving a tape cassette 13. The well 79 may be closed by a cover 80 which is slidable in the direction of the arrow 81 to open the well 79, and which is slidable in a direction opposite to the direction of the arrow 81 for a closure of the well 79 by the cover 80.

Preparatory to the insertion of a cassette 13 into the well 79, the cover 80 is opened. This rotates a gear in a clockwise direction as seen in FIG. 1 by the action of a rack 84 connected to the cover 80 and a gear wheel 85 located between the rack 84 and the gear 83 and being in meshing relationship therewith. The gear 83 is located on the shaft 73 which drives the pulley 70. In this manner, the endless belt 67 is advanced so that the bracket 66 and bracket actuator 57 position the finger portions 54 and 55 in the position illustrated in FIG. 1 preparatory to the insertion of a cassette 13 into the well 79.

The cassette 13 is then inserted whereby the upper edge of the tape 15 slides past and below the finger portions 54 and 55. The cover 80 is then closed which imparts a counterclockwise rotation on the shaft 73 as seen in FIG. 9. This provides for such an advancement of the endless belt 67 that the bracket 66 is moved from the position shown in FIG. 1 to the advanced position shown in FIG. 4. As a result, the finger actuator 57 is rotated by 90°. This pushes the wire spring 60 downwardly whereby the finger portions 54 and 55 are rotated to their alternative position illustrated in FIG. 4.

Figures 4, 5, 6:
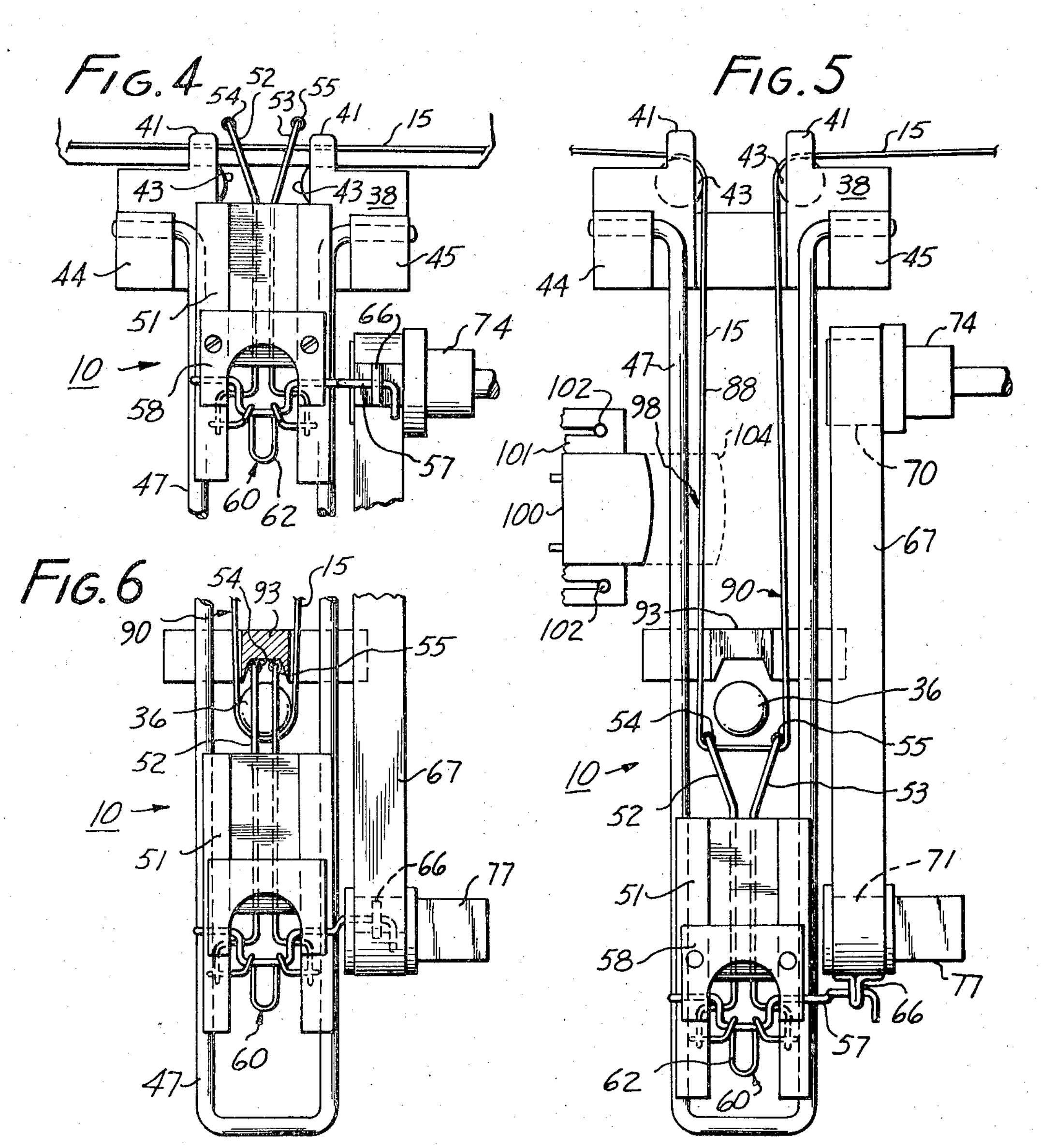
FIG. 4 is a fraction of a top view of the apparatus of FIG. 1, showing a detail of the operation thereof.
FIG. 5 is a further top view of part of the apparatus of FIG. 1, showing a further detail of the operation thereof.
FIG. 6 is yet another top view of part of the apparatus of FIG. 1, showing a still further detail of the operation thereof.

In this alternative position, the finger portions 54 and 55 extend at right angles to the edges of the recording tape 15 and are located behind this recording tape as seen from the front opening of the cassette window 18. Accordingly, further advancement of the belt 67 through continued closing of the cover 80 causes a length of recording tape 88 to be pulled out of the cassette through the window 80 by the finger members 54 and 55, as shown in FIG. 5.

Due to the above mentioned inclination of the endless belt 67, the finger portions 54 and 55 and the pulled-out tape length 88 clear the capstan 36. The fingers 52 and 53 with portions 54 and 55 are thus capable of forming the pulled-out recording tape length into a substantially U-shaped loop 90 as shown in FIG. 5. The commencement of the tape pullout is not only shown in FIG. 4, but also in FIG. 8 which may be consulted at this juncture in connection with FIG. 5.

The objective of the apparatus now is to place the bight portion of the U-shaped loop 90 about part of the periphery of the capstan 36. To this end, the advancement of the endless belt 67 is continued by continuing the closing motion of the cover 80. The bracket 66 on the belt 67 is thereby advanced from the position shown in FIG. 5 to the position shown in FIG. 7, and also in dotted outline in FIG. 6.

An advantage of the illustrated belt 67 with idler pulley 71 over inclined ramps will become apparent at this juncture. If an inclined ramp were employed, it would now be necessary to change the direction of the carriage drive to proceed from the position of the bracket 66 shown in FIG. 5 to the bracket position illustrated in FIGS. 6 and 7. However, in accordance with the illustrated preferred embodiment of the subject invention, the direction of advancement of the belt 67 need not be reversed when the bracket 66 has reached the position illustrated in FIG. 5. More particularly, the idler pulley 71 cooperates with the endless belt 67 in moving the bracket 66 downwardly toward the base plate 39 and backwardly in the direction of the capstan 36 as seen from the cassette window 18.

In this manner, the finger portions 54 and 55 move laterally past the capstan 36 in the direction of a retention member 93. To better illustrate the position of the finger portions 54 and 55, the capstan 36 and the recording tape 15 have not been shown in FIG. 7. It should, however, be understood that the finger members 54 and 55 move past the capstan 36 and into a cavity of the retention member 93 as shown in FIG. 6, when the bracket 66 is moved by the endless belt 67 from the position shown in FIG. 5 to that illustrated in FIGS. 6 and 7. In this manner, the recording tape 15 is placed about part of the periphery of the capstan 36 so as to be in driving engagement with the capstan over an angle of some 180° and the finger portions 54 and 55 are moved out of engagement with the recording tape 15. The capstan 36 preferably has a high-friction outer surface so that the tape 15 is easily advanced without the use of a pinch roller. If desired, the capstan friction may be increased by covering the outer surface of the capstan 36 with an elastomeric sleeve or coating (not shown). The cover 80 has a nose 95 which upon closure of the cassette well 79 actuates a toggle switch 96 in the closed position. This energizes the tape drive 30 so that the capstan 36 and the spindle 28 (see FIG. 8) are rotated for an advancement of the tape 15 and a winding of the advanced tape into a coil 29 (see FIG. 3).

In accordance with principles of the subject invention, this advancement of the recording tape 58 takes place out of the casing 16 in a direction away from this casing and substantially simultaneously back into the casing 16 by way of a recording or other function-performing station 98. As shown in FIG. 5, the recording station 98 may include a magnetic recording head 100 that is connected to conventional electronic tape recording equipment. The recording head is mounted on a plate 101 that is slidable relatively to mounting pins 102 which rise from the base plate 39. The recording head 100 is normally in the retracted position illustrated by solid lines in FIG. 5.

After the extracted tape loop 90 has been placed about the capstan 36 in the position shown in FIG. 6, the recording head is advanced to the dotted position illustrated at 104 in FIG. 5. This moves the recording head 100 into engagement with the recording tape 15 so that the magnetic recording of information onto the tape 15 can commence. During tape advance and recording, the retention member 93 maintains the finger portions 54 and 55 out of engagement with the tape 15 and the rotating capstan 36. In comparing FIGS. 5 and 6 with each other, it will be noted that the fingers 52 and 53 have been shown in a somewhat idealized fashion, in that a certain inward flexing of the fingers 52 and 53 will be observed in practice when the finger members 54 and 55 have entered the cavity of the retaining member 93 as shown in FIG. 6.

The showing of a recording head 100 is only illustrative of many alternatives. For instance, the head 100 could act as a playback head which replays magnetically recorded information from the tape 15. By way of further example, images could be recorded on a photographic film in the recording station 98 if the information carrier is a photographic film. Other possibilities include the viewing or display of pictorial information from the carrier 15 outside of the cassette 13, the photographic development and other processing of film anywhere along the carrier loop 19, the use of a tape or carrier cleaner, the operation of a tape or carrier tension sensor, and the like, all outside of the cassette 13.

Reverting to the illustrated embodiments, and particularly to that shown in FIG. 9, the cover 80 is moved in the direction of the arrow 81 preparatory to the removal of the cassette 13 from the well 79. Since the toggle switch 96 is of a bystable nature, the drive will continue to rotate the capstan and the spindle 28 (see FIG. 8) as the cover 80 is moved to its open position. In this manner, the tape loop is prevented from falling off the finger portions 54 and 55 as the recording tape is returned to the cassette 13.

Opening of the cover 80 advances the bracket 66 on the belt 67 from the position illustrated in FIG. 6 to the position shown in FIG. 5. As a result, the finger portions 54 and 55 move out of the cavity of the retention member 93 and lift the tape 15 off the capstan 36 as shown in FIG. 5. Further opening of the cover 80 and rotation of the spindle 28 (see FIGS. 8 and 9) then results in a successive return of the pulled-out tape length to the cassette 13. The bracket thus moves from the position shown in FIG. 5 to the position illustrated in FIG. 4 and the tape 15 assumes its retracted position, with the finger portions 54 and 55 being located behind the tape as seen from the outer window opening. Further opening movement of the cover 80 advances the bracket 66 on the belt 67 from the position shown in FIG. 4 to the position illustrated in FIG. 1. In this manner, the finger portions 54 and 55 are bistably swung back to their initial position in parallel to the edges of the tape 15. Simultaneously, a nose 106 on the lower surface of the cover 80 actuates the toggle switch 96 to its open position, thereby deenergizing the capstan and tape drive 30. The cassette 13 may now be removed from the recorder and another cassette may be inserted into the well 79 in its place.

It will be recognized at this juncture that actuation of the apparatus 10 by a cassette well cover is only one of many possibilities for extracting tape loops from the cassette window and for returning such tape loops to the cassette. Alternatives include automated servo systems which drive the belt pulley 70 at appropriate instances.

It will also be recognized that the apparatus 10 herein disclosed can in general be employed to extract a length of web through a window in a variety of applications. Since the tape or web leaves the window at a first location delimited by the left-hand roller 43, turns about at a second location occupied by the capstan 36, and moves back into the window at a third location delimited by the right-hand roller 43, it follows that the extracted web can substantially simultaneously be advanced out of, and returned into, the window in a cassette, cartridge, or other container or enclosure.

Figure 8:
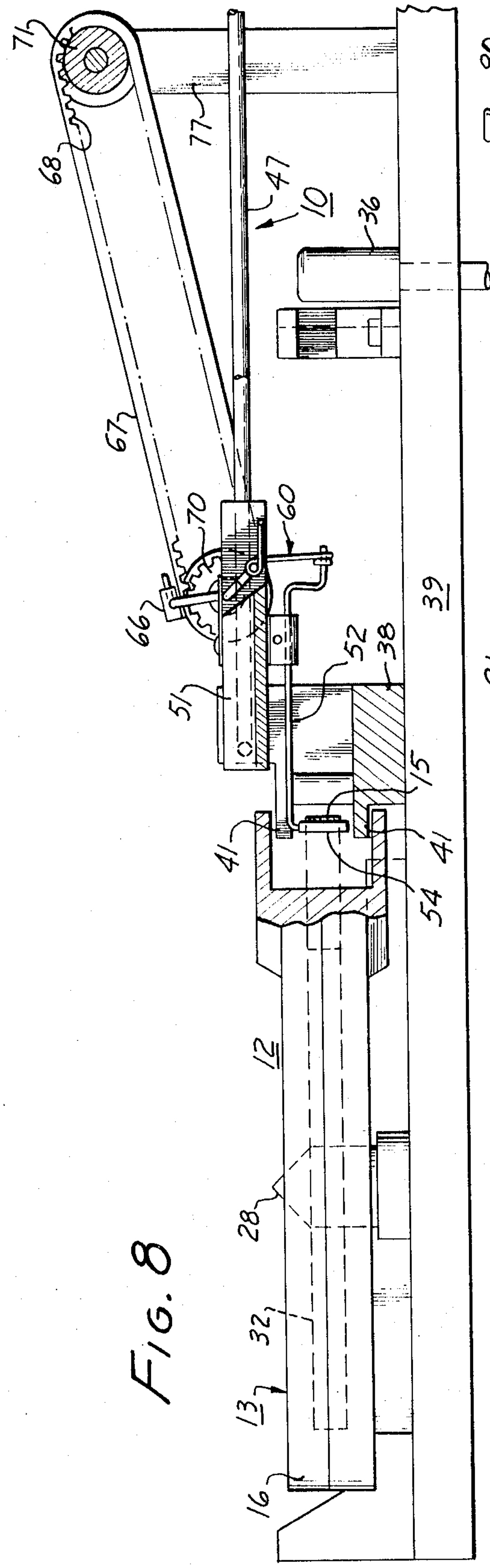
FIG. 8 is a side view of the apparatus shown in FIG. 1.

Moreover, while the capstan 36 has in FIG. 8 been shown as mounted on the base place, it should be understood that roller bearings and other suitable mounting means may be employed for the capstan. Since the capstan may be of relatively large diameter as compared to capstan sizes that are possible with cassette-inserted capstans, and since the capstan 36 does not require the use of pinch rollers, high start and stop speeds are attainable with the preferred embodiments of the subject invention.

I claim:

1. In a method of performing a function relative to an elongate information carrier located in a casing and having a portion initially located inside a window defined by peripheral casing portions, the improvement comprising in combination the steps of:

providing a capstan for driving said information carrier at a distance from said casing;

providing finger means for extracting a length of said information carrier from said casing;

inserting part of said finger means into said casing through said window and in between said information carrier portion and adjacent peripheral housing portion;

moving said inserted finger means part behind said information carrier portion inside said casing;

extracting with said finger means a length of said information carrier from said casing;

placing with said finger means a portion of said extracted information carrier length onto said capstan; moving said finger means out of engagement with said information carrier;

advancing said information carrier with said capstan while said finger means are out of engagement with said information cannier; and performing said function relative to said information carrier while said finger means are out of engagement with said information carrier.

2. A method as claimed in claim 1, including the step of:

lifting with said finger means the information carrier off said capstan.

3. A method as claimed in claim 2, including the step of:

returning with said finger means the extracted information carrier to said casing.

4. A method as claimed in claim 1, wherein:

said finger means are moved during said extraction at an inclined angle as seen from said casing in the direction of said capstan so as to clear said capstan during movement of said finger means away from said casing; and said finger means are then moved laterally past said capstan so as to effect said placing of a portion of said extracted information carrier length onto said capstan.

5. A method as claimed in claim 1, wherein:

said information carrier is advanced out of said casing in a direction away from said casing and substantially simultaneously back into said casing by way of a function-performing station spaced from the outer periphery of said casing; and said function is performed relative to said carrier at said station.

6. A method as claimed in claim 5, wherein:

said information carrier is advanced along a path leading away from said casing, turning about, and leading back to said casing.

7. A method as claimed in claim 6, wherein:

said path is substantially U-shaped.

8. A method as claimed in claim 5, wherein:

said information carrier is advanced in a direction away from said casing by said capstan; and said carrier is turned about for a return to said casing with the aid of said capstan.

9. A method as claimed in claim 5, wherein:

said information carrier is advanced away from and back to said casing along a substantially U-shaped path with the aid of said capstan, said capstan being located inside the bight portion of said path.

10. A method as claimed in claim 5, wherein:

said information carrier is advanced out of said window at a first location and, by way of said station, back into said window at a second location spaced from said first location.

11. A method as claimed in claim 5, wherein:

said information carrier has a first end connected to first rotary means mounted in said casing, and a second end connected to second rotary means mounted in said casing; and said information carrier is selectively wound on, and unwound from, said first and second rotary means.

12. A method as claimed in claim 5, wherein:

said function is a replay of information from said information carrier; and information is replayed from said information carrier at said station.

13. A method as claimed in claim 5, wherein:

said information carrier is a magnetic recording tape;

said function is magnetic recording of information; and information is magnetically recorded on said tape at said station.

14. A method as claimed in claim 5, wherein:

said information carrier is a magnetic recording tape having information recorded thereon;

said function is playback of magnetically recorded information; and magnetically recorded information is played back from said tape at said station.

15. A method as claimed in claim 5, wherein:

said information carrier is a pictorial information carrier;

said function is a recording of pictorial information on said carrier; and pictorial information is recorded on said carrier at said station.

16. A method as claimed in claim 5, wherein:

said information carrier has pictorial information recorded thereon;

said function is a display of said pictorial information; and said pictorial information is displayed from said carrier.

17. In apparatus for performing a function relative to an elongate information carrier located in a casing and having a portion initially located inside a window defined by peripheral casing portions, the improvement comprising in combination:

a capstan for driving said information carrier at a distance from said casing;

finger means for extracting a length of said information carrier from said casing, said finger means having a part adapted for insertion into said casing through said window in between said information carrier portion and adjacent peripheral housing portion;

means connected to said finger means for inserting said finger means part into said casing through said window in between said information carrier portion and adjacent peripheral housing portion;

means connected to said finger means for moving said inserted finger means part behind said information carrier portion inside said casing;

means connected to said finger means for extracting with said finger means a length of said information carrier from said casing;

means connected to said finger means for placing with said finger means a portion of said extracted information carrier length onto said capstan;

means connected to said capstan for advancing said information carrier;

means for performing said function relative to said information carrier; and means for maintaining said finger means out of engagement with said information carrier and with said capstan during said advance of said information carrier and performance of said function.

18. An apparatus as claimed in claim 17, wherein :

said advancing means include means operatively associated with said information carrier for advancing said information carrier out of said casing in a direction away from said casing and substantially simultaneously back into said casing by way of a location spaced from the outer periphery of said casing; and said means for performing said function include means operatively associated with said information carrier for performing said function relative to said information carrier at said location spaced from the outer periphery of said casing.

19. An apparatus as claimed in claim 18, wherein:

said advancing means include means for advancing said information carrier along a path leading away from said casing, turning about, and leading back to said casing.

20. An apparatus as claimed in claim 18, wherein:

said advancing means include means for advancing said information carrier along a substantially U-shaped path.

21. An apparatus as claimed in claim 18, wherein:

said information carrier has information recorded thereon; and said function-performing means include means for replaying said information from said information carrier at said location.

22. An apparatus as claimed in claim 18, wherein:

said information carrier is a magnetic recording tape; and said function-performing means include means for magnetically recording information on said tape at said location.

23. An apparatus as claimed in claim 18, wherein:

said information carrier is a magnetic recording tape having information magnetically recorded thereon; and said function-performing means include means for playing back said information from said tape at said location.

24. An apparatus as claimed in claim 18, wherein:

said information carrier is a pictorial information carrier; and said function-performing means include means for recording pictorial information on said carrier at said location.

25. An apparatus as claimed in claim 18, wherein:

said information carrier bears pictorial information; and said function-performing means include means operatively associated with said carrier at said location for displaying pictorial information from said carrier.

26. An apparatus as claimed in claim 17, wherein:

said finger means include means for forming said extracted length into a substantially U-shaped loop, and placing the bight portion of said loop about said capstan.

27. An apparatus as claimed in claim 17, wherein:

said advancing means include means operatively associated with said information carrier for advancing said information carrier out of said window at a first location to a second location spaced from the outer periphery of said casing and thence back into said window at a third location spaced from said first location; and said means for performing said function include means operatively associated with said information carrier for performing said function relative to said information carrier at said second location spaced from the outer periphery of said casing.

28. An apparatus as claimed in claim 27, wherein:

said casing has spaced first and second rotary means mounted therein;

said elongate information carrier has a first end connected to said first rotary means and includes a first length wound on said first rotary means;

said elongate information carrier further includes a second length extending from said wound first length across said window from one side to another side of said window and to said second rotary means, and a second end connected to said second rotary means;

said advancing means include means for pulling portions of said first carrier length out of said window, and means for subsequently winding said pulled-out portions of said first carrier length onto said second rotary means.

29. An apparatus as claimed in claim 27, wherein:

said advancing means include a drive capstan positioned at a fourth location situated beyond said second location as seen from said window.

30. An apparatus as claimed in claim 29, wherein:

said finger means include means for forming said length into a substantially U-shaped loop, and placing the bight portion of said loop about said capstan.

31. An apparatus as claimed in claim 27, wherein:

said information carrier has information recorded thereon; and said function-performing means include means for replaying said information from said information carrier at said second location.

32. An apparatus as claimed in claim 27, wherein:

said information carrier is a magnetic recording tape; and said function-performing means include means for magnetically recording information on said tape at said second location.

33. An apparatus as claimed in claim 27, wherein:

said information carrier is a magnetic recording tape having information magnetically recorded thereon; and said function-performing means include means for playing back said information from said tape at said second location.

34. An apparatus as claimed in claim 27, wherein:

said information carrier is a pictorial information carrier; and said function-performing means include means for recording pictorial information on said carrier at said second location.

35. An apparatus as claimed in claim 27, wherein:

said information carrier bears pictorial information; and said function-performing means include means operatively associated with said carrier at said second location for displaying pictorial information from said carrier.

36. An apparatus as claimed in claim 17, wherein:

said apparatus has a well for receiving said casing, an actuable door for selectively covering said well, and means coupled to said door for actuating said finger means upon actuation of said door.

37. An apparatus as claimed in claim 17, wherein:

said finger means include a pair of finger portions; and said apparatus includes means coupled to said finger means for placing said finger portions of said pair substantially in parallel to an edge of said carrier length in said window upon insertion of said finger means into said window, and thereafter placing said finger portions substantially at right angles to said carrier length edge and behind said carrier length as seen through said window from the outside of said casing.

38. An apparatus as claimed in claim 37, wherein:

said finger portion placing means include means for bistably retaining said finger portions in parallel to said carrier length edge and alternatively at right angles to said carrier length edge.

39. An apparatus as claimed in claim 17, wherein:

said apparatus includes means for positioning said capstan at a fourth location situated beyond said second location as seen from said window; and said means for placing a portion of said extracted information carrier length onto said capstan include means for moving said finger portions with a fetched carrier length out of said window and to said fourth location for engagement of said fetched carrier length with said capstan.

40. An apparatus as claimed in claim 39, wherein:

said means for moving said finger portions with a fetched carrier length include endless belt means extending from the vicinity of said window to a fifth location situated beyond said fourth location as seen from said window.

41. In apparatus for performing a function relative to an elongate information carrier located in a casing and having a portion initially located inside a window defined by peripheral casing portions, the improvement comprising in combination:

a capstan for driving said information carrier located at a distance from said casing;

finger means including a pair of finger portions for extracting a length of said information carrier from said casing;

means coupled to said finger means for placing said finger portions into a first position for an insertion of said finger portions into said casing through said window and in between said information carrier and a peripheral casing portion;

means coupled to said finger means for selectively placing said finger portions from said first position into a second position behind said information carrier in said casing;

means coupled to said finger means for extracting said finger portions with a length of said information carrier from said casing;

means coupled to said finger means for placing a portion of said extracted length of information carrier onto said capstan at a distance from said casing;

means connected to said capstan for advancing said information carrier;

means for performing said function relative to said information carrier; and means for maintaining said finger means out of engagement with said information carrier and with said capstan during said advance of said information carrier and performance of said function.

42. An apparatus as claimed in claim 41, wherein:

said extracting means include endless belt means extending from the vicinity of said window to a location spaced from said window for advancing an extracted length of said information carrier to said capstan.

43. An apparatus as claimed in claim 41, wherein:

said means coupled to said finger means for placing said finger portions into a first position include means for placing said finger portions substantially in parallel to an edge of said information carrier; and said means coupled to said finger means for selectively placing said finger portions from said first position into a second position include means for placing said finger portions substantially at right angles to said information carrier edge and behind said information carrier in said casing.

44. An apparatus as claimed in claim 42, including:

means for bistably retaining said finger portions substantially in parallel to said edge and alternatively substantially at right angles to said edge.

45. In a method of performing a function relative to an elongate information carrier located in a casing, the improvement comprising in combination the steps of:

providing a capstan for driving said information carrier at a distance from said casing;

providing finger means for extracting a length of said information carrier from said casing;

extracting with said finger means a length of said information carrier from said casing;

moving said finger means during said extraction at an inclined angle as seen from said casing in the direction of said capstan so as to clear said capstan during movement of said finger means away from said casing;

thereafter moving said finger means laterally past said capstan so as to place a portion of said length of extracted information carrier onto said capstan;

advancing said information carrier with said capstan; and performing said function relative to said information carrier.

46. A method as claimed in claim 45, wherein:

said finger means are partially inserted into said casing in between said information carrier and an adjacent portion of said casing;

said partially inserted finger means are moved behind said information carrier inside said casing; and said partially inserted finger means are then extracted for extracting a length of said information carrier from said casing.

47. A method as claimed in claim 45, wherein:

said finger means are provided with two finger portions;

said finger portions are placed into a first position for an insertion of said finger portions into said casing in between said information carrier and an adjacent portion of said casing;

said inserted finger portions are moved from said first position to behind said information carrier inside said casing;

said inserted finger portions are then extracted for extracting a length of said information carrier from said casing;

said extracted finger portions are moved at said inclined angle so as to clear said capstan; and said extracted finger portions are thereafter moved laterally past said capstan, with one finger portion being moved past said capstan to one side thereof and the other finger portion being moved past said capstan to the other side thereof, so as to place a portion of said length of extracted information carrier onto said capstan.

48. In apparatus for performing a function relative to an elongate information carrier located in a casing, the improvement comprising in combination:

a capstan for driving said information carrier located at a distance from said casing;

finger means for extracting a length of said information carrier from said casing;

means connected to said finger means for moving said finger means during said extraction at an inclined angle as seen from said casing in the direction of said capstan so as to clear said capstan during movement of said finger means away from said casing and for thereafter moving said finger means laterally past said capstan so as to place a portion of said length of extracted information carrier onto said capstan;

means connected to said capstan for advancing said information carrier with said capstan; and means for performing said function relative to said information carrier.

49. An apparatus as claimed in claim 48, wherein:

said moving means include an endless belt extending at an inclined angle as seen from said casing in the direction of said capstan, means for coupling said finger means to said endless belt, and means for driving said endless belt.

50. An apparatus as claimed in claim 49, wherein:

said finger means include two finger portions; and said moving means include carriage means, means for mounting said finger means on said carriage means, track means for said carriage means, finger actuating means connected to said endless belt, said actuating means include means for moving said finger portions to a first position for an insertion of said finger portions into said casing, means for inserting said finger portions into said casing, means for moving said inserted finger portions from said first position to a second position behind said information carrier, and means for extracting said finger portions with a length of said information carrier from said casing.

* * * * *

UNITED STATES PATENT OFFICE
CERTIFICATE OF CORRECTION

Patent No. 3,730,613 Dated May 1, 1973

Inventor(s) Joseph J. Neff

It is certified that error appears in the above-identified patent and that said Letters Patent are hereby corrected as shown below:

Column 2, line 8, --and having a portion initially located inside a window defined by peripheral casing portions.-- should be inserted after "casing".

Column 2, line 36, "steps" should be --step--.

Column 6, line 63, "cassette" should be --cassettes--.

Column 13, line 7, "cannier" should be --carrier--.

Signed and sealed this 8th day of January 1974.

(SEAL)
Attest:

EDWARD M.FLETCHER,JR.
Attesting Officer

RENE D. TEGTMEYER
Acting Commissioner of Patents

FORM PO-1050 (10-69)

USCOMM-DC 60376-P69
☆ U.S. GOVERNMENT PRINTING OFFICE : 1969 O—366-334.